United States Patent

Rodriguez et al.

[11] Patent Number: 5,934,332
[45] Date of Patent: Aug. 10, 1999

[54] PIPE LINING

[75] Inventors: Alan Rodriguez, Lancaster; John Arthur Rose, Settle, both of United Kingdom

[73] Assignee: Angus Fire Armour Limited, Lancaster, United Kingdom

[21] Appl. No.: 08/624,573

[22] PCT Filed: Sep. 29, 1994

[86] PCT No.: PCT/GB94/02117

§ 371 Date: Mar. 28, 1997

§ 102(e) Date: Mar. 28, 1997

[87] PCT Pub. No.: WO95/10006

PCT Pub. Date: Apr. 13, 1995

[30] Foreign Application Priority Data

Oct. 5, 1993 [GB] United Kingdom ............ 9320487

[51] Int. Cl.[6] .................................. F16L 55/162
[52] U.S. Cl. .................... 138/98; 138/97; 138/119; 138/DIG. 3; 138/DIG. 11
[58] Field of Search ............... 138/97, 98, 119, 138/DIG. 3, DIG. 11

[56] References Cited

U.S. PATENT DOCUMENTS

| 2,903,016 | 9/1959 | Cobi .................................. 138/119 |
| 3,201,861 | 8/1965 | Fromson et al. ................. 138/119 |
| 4,446,891 | 5/1984 | Gebelius ............................ 138/98 |
| 4,776,370 | 10/1988 | Long, Jr. ........................... 138/98 |
| 4,883,557 | 11/1989 | Morinaga et al. ................ 138/98 |
| 5,186,987 | 2/1993 | Imoto et al. ...................... 138/98 |
| 5,265,648 | 11/1993 | Lyon .................................. 138/98 |
| 5,397,513 | 3/1995 | Steketee, Jr. ..................... 138/98 |
| 5,487,411 | 1/1996 | Goncalves ......................... 138/98 |
| 5,562,127 | 10/1996 | Fanselow et al. ............... 138/141 |

FOREIGN PATENT DOCUMENTS

| 0065886 | 12/1982 | European Pat. Off. . |
| 0301895 | 2/1989 | European Pat. Off. . |
| 2003576 | 3/1979 | United Kingdom . |
| 2188695 | 10/1987 | United Kingdom . |

Primary Examiner—James F. Hook
Attorney, Agent, or Firm—Baker & Botts, L.L.P.

[57] ABSTRACT

A tubular liner for a pipe is collapsed on itself to define a pair of lobes. The lobes are folded into a central region so that bending modulus and radius are reduced. The liner can be stored in a tighter coil and can be introduced into an underground pipe to be lined at a more acute angle.

10 Claims, 3 Drawing Sheets

PIPE LINING

This invention relates to pipe lining for renovating or rehabilitating pipes or other conduits bearing, for example, water, gas, sewage or other fluids. The invention is particularly applicable to pipe liners for underground pipes.

When such underground pipes have deteriorated by, for example, corrosion, ageing or other damage, repair or renewal by methods which require the digging of a trench along the full length of the pipe are expensive, timeconsuming and cause disruption especially in urban areas.

Various methods exist to rehabilitate pipes by the in situ insertion of a pipe liner which fits closely within the pipe and which may be bonded to the inside of the pipe. Several processes exist whereby relatively rigid plastics lining pipes made from polyethylene or similar materials, are treated to reduce their original diameter sufficiently so that they can be pulled into the existing pipe and then further treated to regain their original diameter and form a close internal fit with the existing pipe.

A previously proposed collapsed pipe liner is illustrated in FIG. 1 of the drawings. Such liners have a smaller bend radius than a circular cross-section liner, require lower pull-in loads and may be used for lining pipes which are not truly circular in cross-section. However, such liners need to have relatively thin walls in order to be deformable into the described cross-sections and this limits their mechanical performance in terms of their ability to withstand internal or external pressure when unsupported. By way of clarification external pressure may be considered to be derived from loads transmitted through a saturated sub-soil from, for example, the vehicles on a roadway above. This external pressure can result in collapse of the liner if it is not sufficiently rigid.

A disadvantage with such systems is that the liners have a large bending radius due to their rigidity and circular cross-section. The diameter is only slightly less than the diameter of the pipe to be lined and, thus, long lengths of liner have very large coil diameters which is both inconvenient for delivery and use on site. Furthermore, insertion is difficult because of the small diameter difference between the pipe and the liner.

Underground pipe renovation using a relining technique requires first, the provision of suitable relining materials for the main pipeline. Secondly, tappings or branch attachments and a means of attaching them to pipes leading from the main relined pipeline to individual units such as houses, etc. and thirdly an integrated system for inserting such linings into the existing pipe and fixing such lateral attachments to the pipeline after it has been relined.

A further disadvantage of current systems is that the processes of insertion of the line and branch connections may allow the ingress of external soil and dirt requiring additional cleansing processes before the renovated pipeline system can be used for conveying water suitable for drinking and domestic and industrial use.

It is therefore an object of the present invention to provide pipe relining materials capable of easy insertion in long lengths. It is a further object of this invention to provide a hygienic inner surface without the need for further extensive cleaning and sterilisation after the pipe has been lined.

According to the present invention there is provided a method of lining a pipe comprising collapsing a tubular liner so that the liner comprises a pair of adjacent liner portions defining a middle region connected by longitudinally extending lobes, folding both lobes laterally onto the middle region so that the lobes lie in a laterally opposed relationship in the middle region, advancing the collapsed and folded liner along the pipe to be lined and unfolding and urging the liner against the internal surface of the said pipe.

A liner collapsed and folded in this way has a significantly reduced bending radius and can be inserted in a pipe to be lined at a more acute angle, saving on the space required at either end of the pipe.

Preferably, the liner is unfolded and urged against the internal surface of the pipe by the application of heat and pressure to the inside of the liner.

The liner may be coiled in the folded condition and transported to the site of the repair.

Preferably, the liner is collapsed, and formed into the folded cross section at an elevated temperature sufficient to soften said liner, then cooled causing it to be stable to deformation when coiled in said folded condition.

Preferably, the ends of the liner in said folded condition are both sealed, for example by application of heat and pressure, and subsequently cooled as part of the forming operation.

A sterilising agent, such as sodium hypochlorite solution may be injected into the interior of the liner before said sealing process to further assist protection of the liner interior from contamination, for example by microorganisms or fungal growth which might affect its suitability for subsequently conveying fluids such as drinking water.

The invention extends to a liner for lining a pipe, comprising a substantially flat middle region of liner material and a pair of lobes of liner material laterally folded over so that the lobes lie in the middle region in a laterally opposed relationship.

Preferably, the lobes are both folded onto the middle region. For example, the lobes may be folded onto the same liner portion of the middle region or respectively onto adjacent liner portions.

The collapsed and folded liner gives minimum longitudinal bending moduli and radii and permits insertion into the pipe to be lined with lower pressure against the pipe walls, and thus lower friction forces and pull-in loads.

Preferably, the liner comprises inner and outer plastics layers and an intermediate fabric reinforcing layer.

Preferably, the inner and/or outer layers are made of thermoplastics materials. Desirably, they are self-supporting at ambient operational temperatures but deformable at elevated temperatures.

In a fibre reinforced liner, the reinforcement should be relatively thin and be able to tolerate flexing so that the liner can be collapsed for insertion. Furthermore, the liner should have a high tensile strength in the warp direction and yet be yielding to expand in the weft direction to accommodate variations in pipe internal diameter and shape.

The inner layer of the liner must be impervious to the fluid to be carried in the lined pipe and is usually compatible with it. The inner layer may be elastomeric, in which case it does not contribute to the overall stiffness of the inserted liner. The inner layer may be made of a thermoplastics material which is more stiff when it is in place and does contribute to external pressure resistance.

The outer layer of the liner has one function of protecting the fibre reinforcement from damage during liner handling and insertion. Again the outer layer may also be elastomeric and/or thermoplastic.

It is desirable to make the liner wall as thin as possible so that it adds as little as possible to the flow capacity of the pipe. Furthermore, a thin liner will have a small wall bending radius allowing more compact folds and more compact coils. The thickness of the liner wall also contributes to the insertion resistance. The mass of the liner also affects the amount of heat required to soften the inserted liner and the rapidity with which it cools. A thin liner will require less heat to soften and cool more rapidly than a thick one. Lastly, a thin pipe is more easily adaptable to variations in pipe diameter and cross-section for a given amount of heat and pressure applied.

The tubular reinforcement, constituted by the fabric layer, may be made of multi-filament or mono-filament staple, corded or twisted yarns, or a mixture made into a fabric by a process of weaving, braiding, wrapping, felting, knitting or similar process.

After insertion the application of heat and internal pressure causes the liner to soften and to reform to a cylindrical shape, and may also expand the original circumference by up to 40% and thus provide a close fitting liner which complies with the profile or circumference of the pipe to be lined and, within limits, allows for changes in this profile along the length of the pipe.

The present invention can be put into practice in various ways, some of which will now be described by way of example with reference to the accompanying drawings in which.

Figure 2:
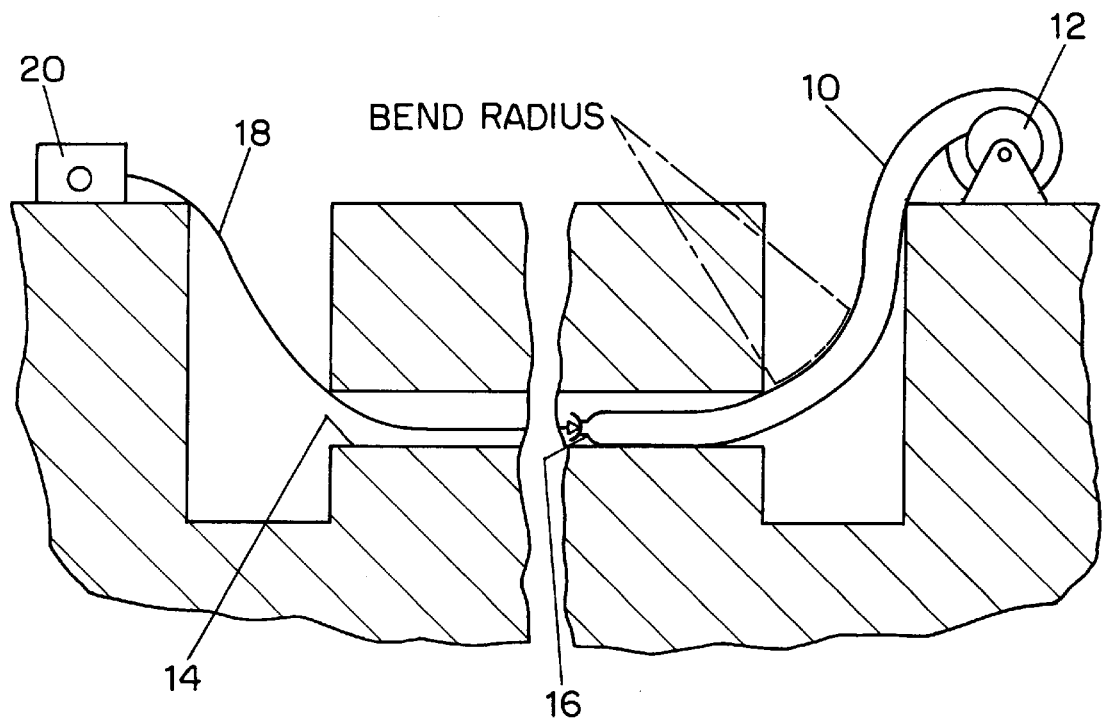
FIG. 2 is a cross-section of a typical pipe liner installation system.

A typical 'pull-through' pipe lining system for a buried pipe is illustrated in FIG. 2. The pipe to be renovated may be of metal, ceramics, plastics or other material. A length of pipe liner 10 is paid out from a drum 12 on the surface. At each end of the pipe 14 to be lined access trenches are formed so that the liner 10 can be introduced into the pipe 14, at one end, and hauled out of the pipe, at the other. The leading end of the liner 14 is attached to a rope 18 which is wound onto a motorised winch 20. Thus, the liner is winched through the pipe 14 until sufficient length of the liner for the length of pipe has been inserted.

Figure 3:
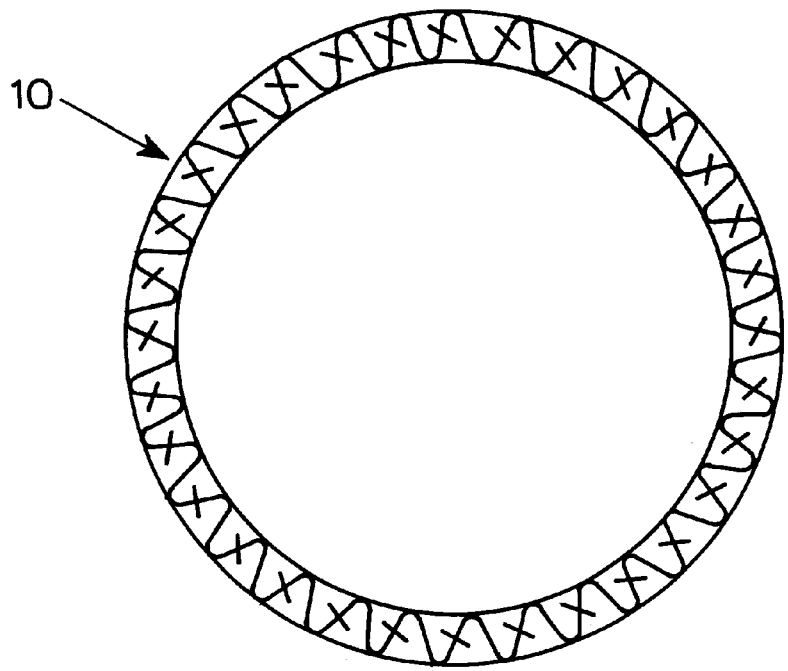
FIG. 3 is a cross-section of a pipe liner according to the invention.

By way of illustration: a typical liner will have a wall thickness of about 2.5 mm for a 100 mm diameter pipe or about 5.0 mm for a 300 mm diameter pipe. A cross-section of a suitable liner is shown in FIG. 3.

The access trenches must be long enough to accommodate the longitudinal bend radius of the lining pipe. This, and slight misalignment of the joint sections of a pipe to be lined, cause high friction loads due to the resistance of the lining pipe to bending, thus limiting the length of liner which can be inserted in one operation and necessitating the use of high winch loads. It has been proposed to collapse a pipe liner of circular cross-section prior to its insertion in the pipe to be lined. Once in place the liner is treated with heat and pressure to recover its generally circular cross-section.

Figure 4:
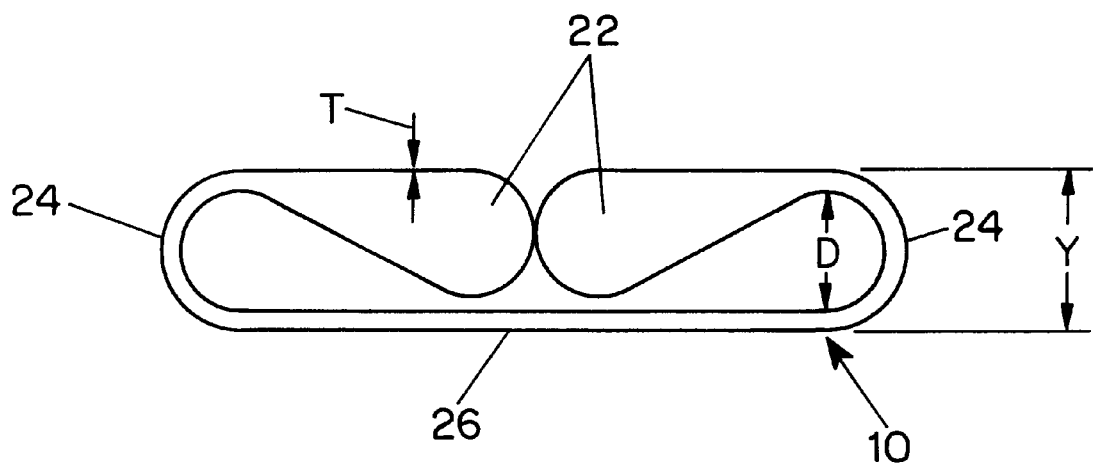
FIG. 4 is a cross-section of the liner of FIG. 3 folded according to a first embodiment of the invention.
Figure 5:
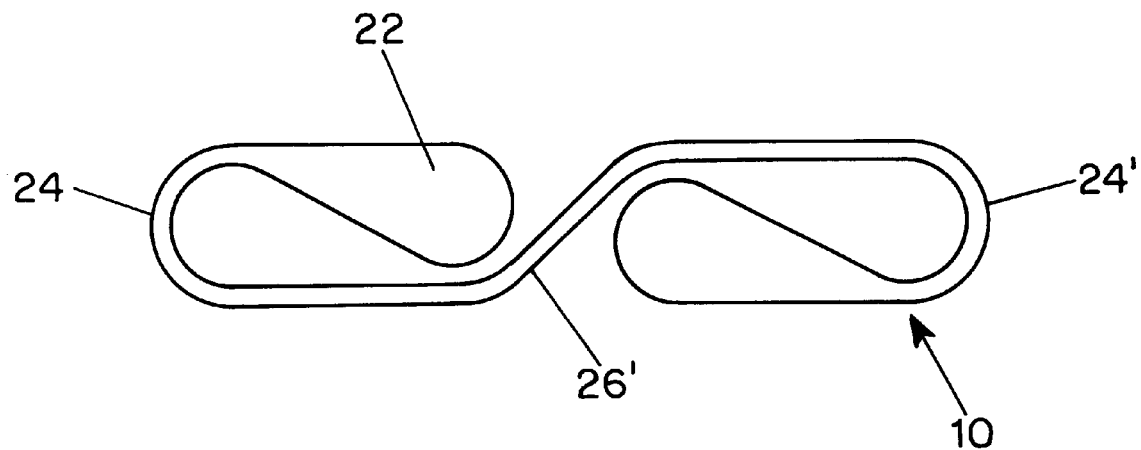
FIG. 5 is a cross-section of the liner of FIG. 3 folded according to a second embodiment of the invention.
Figure 6:
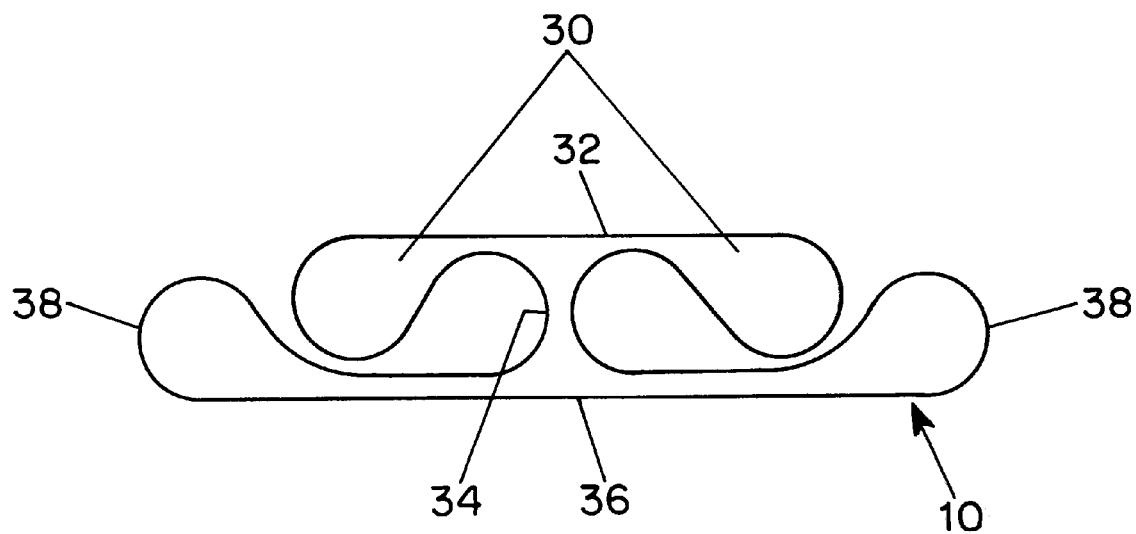
FIG. 6 is a cross-section of the liner of FIG. 3 folded according to a third embodiment of the invention.

Examples of cross-sectional profiles of pipes according to the invention are shown in FIGS. 4 to 6. These are significant improvements over the previously proposed arrangements of collapsed pipe liner because they exhibit a small bend radius with lower longitudinal bending modulus are still being folded into shapes with external dimensions that are smaller than the inside dimensions of the pipe to be lined.

The liner 10 in FIG. 4 is arranged so that the lateral lobes 22 of the collapsed liner are mutually folded inwardly about longitudinal fold regions 24. The folds are in opposite senses so that the lobes 22 face each other above the surface of the central flat region 26 of the liner 10. As will be seen below, it is not essential that the lobes meet in the lateral middle of the central flat region 26 nor that the lobes 22 be folded in opposite senses so that they come to rest on a common surface of the central region.

In FIG. 5, the flattened liner 10 has been subjected to a fold about one fold region 24 which is in a clockwise sense, as before, and about the anti-clockwise sense about the other fold region 24'. The lobes 22 now lie on the central region 26' but on opposite sides thereof.

FIG. 6 illustrates an alternative arrangement in which the liner 10 is gathered into a pair of inner lobes 30 having a common outer surface 32 and defining a central stem 34. The stem diverges laterally outwardly and is connected to a flat opposite surface 36 of the liner by outer lobes 38.

Reference to FIGS. 4 to 6 show that, in comparison to the previously proposed arrangements, the liner arrangements have a smaller depth Y for any given wall thickness T and internal bend diameter D within the profile and thus would have a lower longitudinal bend radius for the plastics material used. As working approximations and referring to FIGS. 1 and 4:

For FIG. 4 Y=D+4T

Figure 1:
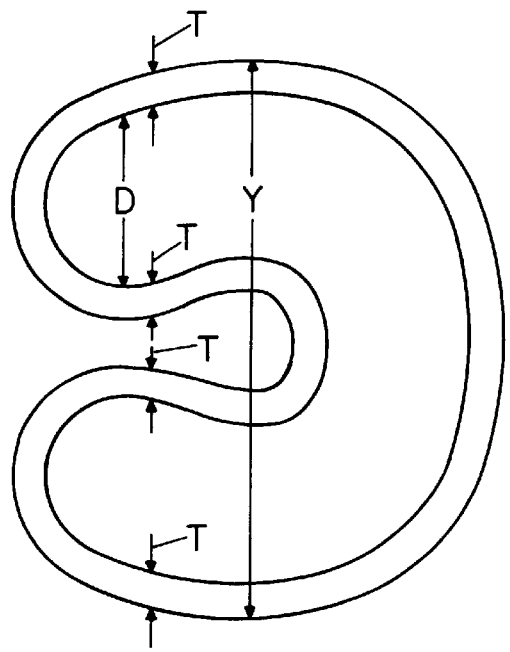
FIG. 1 is an example of a known collapsed liner arrangement.

For FIG. 1 Y=2D+4T

Clearly, within the working specification the liner has to meet, it is advantageous to keep the wall thickness T and the bend diameter D as small as possible.

Those shapes or profiles which provide minimum bend radius with low longitudinal bending modulus and which also have a width and depth smaller than the pipe to be lined are characterised in that any cross-section taken perpendicular to the lateral extent of the pipe liner to the depth or minimum dimension will contain no more than four wall thicknesses T and not more than one internal fold which may be formed from a single wall or a double wall to give a doubled walled concentric fold and no cross-sectional dimension shall be greater then the internal dimension of the pipe to be lined.

Of particular importance is the fact that no two folds creating lobes in the liner are arranged one on top of the other with respect to a plane perpendicular to the lateral extent of the folded liner. The liner may then be more acutely bent about a radius also perpendicular to the lateral extent of the folded liner. Because of this, the access trenches do not have to be as long as was previously the case for a given buried depth of pipe to be lined. Furthermore, the diameter and general dimensions of the delivered coil of collapsed and folded liner are considerably reduced.

While the known arrangements of collapsed liner reduce the external dimensions and also reduce the bending modulus, they are not ideal in that they also have a width and depth below the dimensions of the pipe to be lined, they are still inconveniently thick and thus have a significantly high bend radius and longitudinal bending modulus in the plane along the axis of their widest cross-sectional dimension. It should be noted that, in the pipe lining art, the minimum bend radius is considered to be that where the lining tube forms a smooth bend substantially without buckling or kinking.

Turning to the composition of the liner itself: a circular woven textile tube with a total wall thickness of 1.5mm was produced using polyester yarns and designed to have a burst pressure of 41 bar when lined with an impervious material. The internal diameter of the tube when measured in an unstrained condition was 107mm. A low density polyethylene plastics was extruded through and around the textile tube in known manner to form a relatively rigid reinforced tube with an external diameter of 98mm and a total wall thickness of 2.5mm. Drawing the textile tube through the plastics extrusion process tends to remove weaving crimp from the warp fibres and crimp the weft so that a reduction in effective liner diameter results.

A small quantity of sodium hypochlorite solution was poured into the leading end of the tube, and then the tube was passed continuously through an apparatus which heated it with steam to approximately 100° C., followed by passage through a system of forming rollers which flattened the tube and then folded it into the profile as shown in FIG. 2. The leading end of the profiled tube was then heat sealed over a distance of about 20 cm., using a heated press, and, whilst still warm and malleable, due to the profiling process, the profiled tube was coiled onto a reel with a core diameter of 300 mm. To maintain the folded shape, the lobes are arranged to be radially outside the middle, relatively flat, region of the liner when it is coiled up. The trailing end of the profiled liner was then heat-sealed.

Sealing both ends of the tube at the factory where the tube is formed prevents ingress of any foreign matter during storage, transport and initial into the pipe to be lined. The presence of the sterilising agent distributed within the sealed liner maintains the internal sterility as well.

The lining tube was then deployed and pulled into a 106mm inner diameter steel pipe to be lined which was 50m in length. The maximum pulling force used was 20kg.

Applying a tension of a few hundred kilogrammes force, once the liner is in place, across the ends of the liner (the actual force depends on the length of the pipe and the number of bends) will help the liner to form during the steaming process.

Partially opening the cold folded liner with gas such as air or nitrogen at a pressure of up to 1 bar or so prior to the application of steam also helps in the liner inflation process. In effect, gas pushes any twist that has formed in the folded liner ahead of the point of opening so that the twist is finally relieved by the liner rotating at the opposite end to where the gas is applied. Expanded liner prior to any twist point is locked against the host pipe and cannot subsequently twist when steam is applied.

Steam at atmospheric pressure was then directed onto one end of the collapsed liner now lying in the steel pipe. Once this one end became warm and pliable a steam coupling was attached and steam at atmospheric pressure was then passed down the centre of the lining for about 5 minutes until live steam emerged from the opposite end of the liner. A valve coupling was then attached at the outlet end and steam passed at a pressure of 1 bar for a further two minutes. At this stage the liner had softened sufficiently to assume a more or less round profile. The steam supply was then stopped and then nitrogen (an inert gas) at 1.4 bar pressure was introduced to the inside of the liner to inflate and expand it against the pipe. This pressure was maintained for thirty minutes until the liner cooled and became rigid. When the internal pressure was removed, the liner remained as a close fitting inner pipe.

End fittings and lateral pipe connections were then attached to the lined pipe and the liner was tested satisfactorily for pressure resistance and leaks at 21 bar water pressure.

The presence of the sodium hypochlorite solution in the sealed liner, and the use of steam at 1 bar pressure to inflate the liner, was found to assist in ensuring the liner remained sterile during installation.

In this trial, it should be noted that the reinforced lining tube was softened by passing a hot fluid, steam, at atmospheric pressure down the inside until the whole tube was warm and then reformed and expanded to a generally circular cross-section fitting closely to the pipe to be lined by pressurising with a cold fluid, in this case air. The lining tube retains sufficient heat to permit reformation and expansion when pressurised cooling air is introduced immediately after the heating cycle with a hot fluid.

It is, of course, possible to apply a hot fluid under pressure so that heating, reformation and expansion are effected by the hot fluid, for example steam. Subsequent progressive replacement of the hot fluid by a similarly pressurised cold fluid allows the liner to cool and become rigid. Alternatively, hot pressurised fluid such as water or oil could be used to cause reformation and expansion and the fluid can then be allowed to cool under pressure.

Once the steam is removed and the liner is still hot and deformable it is necessary to continue the application of pressure to hold the liner close to the pipe wall and to cool and assume its rigid profile conforming to the profile of the pipe to be lined.

The resistance to internal pressure of such a lining tube is provided by the tubular fabric reinforcement and is largely independent of the polymer layers on the inside and outside. By folding the liner according to the invention it has a particularly low resistance to being pulled into the pipe to be lined. Because of the high tensile strength of the fabric reinforcement very long lengths (e.g. 1km) of liner may be pulled into the pipe to be lined without exceeding the braking strength of the liner.

It is possible to use the same thermoplastics material as the inner layer and as the outer covering layer in cases where the thermoplastics chosen is compatible with the fluid to be carried. By, 'compatible' is meant that the hose polymer is not damaged, degraded, swollen or otherwise undermined by the fluid to be carried by the lined pipe and that the hose polymer does not release material into the fluid which might change its intended use, e.g. by imparting taste or odour to drinking water, by releasing poisonous materials, releasing petrol soluble solids into petrol or, in the case of gaseous fluids, allowing diffusion through the walls of the liner.

When the same thermoplastics is used for the inner and outer layers the liner should exhibit stiffness at ambient temperatures of, for example, less than 20° C. and be deformable at elevated temperatures of around 80° C. and above. The exact temperatures depend on the characteristics of the thermoplastics used.

The resistance of the lining tube to compressive forces is a function of diameter, wall thickness and the stiffness or bending modulus of the thermoplastics used. Thus, with a given fabric reinforced tube of known diameter and burst resistance, it is possible to vary the resistance to compression by changing the wall thickness and/or using thermoplastics of different flexural modulus. Where the same thermoplastics is used inside and outside the fabric reinforcement it is possible to vary the thickness of either layer and thus vary the resistance to compression. For example, polyolefins and their copolymers or blends are generally suitable for carrying drinking water and may be used for the inner and outer layers. Specific examples are polyethylene, polypropylene, polybutylene and copolymers thereof.

Where the inner polymer layer is chosen only for its compatibility with the fluid to be carried, it may be a relatively rigid material which is deformable and expandable at the temperatures and pressures used for reformation and expansion of the liner or it may be an elastomer which is thermoplastics or not. Where a relatively non-thermoplastic and rigid material, for example nylon, is used as the inner polymer layer, it is only necessary to use a very thin layer so that the stress on the material is very high when heat and internal pressure is applied and expansion beyond the yield point can take place.

Liners of this type may be produced, for example, by a tandem or co-extrusion process in which the inner polymer layer is extruded through the tubular fabric reinforcement to form a lining and the outer polymer layer is extruded around the fabric to form the outer cover either in a single or successive extrusion operation. Alternatively, liners may be produced by extruding the outer plastics layer around the tubular fabric, some of which may also go through the fabric and form an inner layer, and at a later stage bonding onto the inside a preformed tube of plastics to be used for the inner layer. In such cases an adhesive layer may be used between the inner and outer polymer layers.

In tandem extrusion the textile jacket passes through an extrusion head which provides the inner coating by forcing a first polymer through the fabric weave. Then this is passed through a separate second extruded which applies the outer coating of a second polymer.

In co-extrusion both the inner and outer layers are applied to the textile jacket as above, but both are within one extrusion head fed with the first and second polymers.

The resistance of a pipe to deformation by external pressure is largely a function of pipe diameter, wall thickness and flexural modulus the material used. With a small diameter pipe of thick wall section, a material of relatively low flexural modulus could provide sufficient resistance to external pressure. Thus, there is no specific value for flexural modulus which clearly separates rigid from non-rigid plastics in the context of this invention. Generally however, plastics with a flexural modulus above 100MPa will be considered stiff and those with a flexural modulus below 50MPa will be considered to be flexible.

We claim:

1. A method of lining a pipe with a liner, the pipe having a length and an internal surface, comprising the steps of:
    forming a flattened liner by collapsing a tubular liner so that said flattened liner comprises a pair of adjacent liner portions defining a longitudinally extending middle region and a pair of longitudinally extending lobes formed at the lateral ends of said middle region;
    forming a folded liner by folding said pair of longitudinally extending lobes laterally onto said middle region so that said pair of longitudinally extending lobes lie in a laterally opposed relationship in said middle region;
    advancing said folded liner through the entire length of said length of pipe to be lined; and
    after said folded liner has been advanced through the entire length of said pipe to be lined, unfolding and expanding said liner against the internal surface of said length of pipe.

2. The method of claim 1 wherein said liner is configured to have an inside and wherein said step of unfolding and expanding said liner against the internal surface of said length of pipe is performed by applying pressure and heat to said inside of said liner.

3. The method of either claim 1 or claim 2 wherein said step of forming said flattened liner and said step of forming said folded liner are performed at an elevated temperature sufficient to soften said liner, and wherein said folded liner is then cooled to cause said folded liner to remain stably deformed in a folded state prior to being advanced through the inside of said length of pipe to be lined.

4. The method of either claim 1 or claim 2 wherein said liner is configured to have a first end and a second end, and wherein said first and second ends are sealed prior to said folded liner being advanced through the inside of said length of pipe to be lined.

5. The method of claim 4 further comprising the step of introducing a sterilizing agent into said liner prior to said first and second ends being sealed.

6. The method of claim 5 wherein said sterilizing agent contains sodium hypochlorite.

7. A liner for lining a pipe having a length and an internal surface, comprising:
    a substantially flat middle region of liner material, said substantially flat middle region being formed by an upper liner portion and an adjacent lower liner portion; and
    a pair of lobes of liner material laterally folded over so that said lobes lie in said substantially flat middle region of liner material in a laterally opposed relationship, said pair of lobes joining said upper liner portion and said lower liner portion forming said substantially flat middle region, said liner being arranged to be advanced in a collapsed and folded condition through the inside of said length of pipe to be lined and, after said liner is in place inside said length of pipe to be lined, unfolded and expanded against the internal surface of said length of pipe.

8. The liner according to claim 7 wherein both of said pair of lobes of liner material are folded onto said upper liner portion of said substantially flat middle region of liner material.

9. The liner according to claim 7 wherein one of said pair of lobes of liner material is folded onto said upper liner portion of said substantially flat middle region of liner material, and wherein the other of said pair of lobes of liner material is folded onto said lower liner portion of said substantially flat middle region of liner material.

10. A method of lining a pipe with a liner, the pipe having a length and an internal surface, comprising the steps of:
    selecting an open-ended tubular liner for the length of pipe to be lined, said open-ended tubular liner having a first open end and a second open end;
    sealing said first open end of said open-ended tubular liner;
    introducing a sterilizing agent into said open ended tubular liner through said second open end of said open-ended tubular liner;
    sealing said second open end of said open-ended tubular liner to form a sealed liner;
    forming a flattened sealed liner by collapsing said sealed liner so that said flattened sealed liner comprises a pair of adjacent liner portions defining a longitudinally extending middle region and a pair of longitudinally extending lobes formed at the lateral ends of said middle region;
    forming a folded sealed liner by folding said pair of longitudinally extending lobes laterally onto said middle region so that said pair of longitudinally extending lobes lie in a laterally opposed relationship in said middle region;
    advancing said folded sealed liner through the entire length of pipe to be lined; and
    after said folded sealed liner has been advanced through the entire length of pipe to be lined, urging said folded sealed liner against the internal surface of said length of pipe.

* * * * *

UNITED STATES PATENT AND TRADEMARK OFFICE
CERTIFICATE OF CORRECTION

PATENT NO. : 5,934,332

DATED : August 10, 1999

INVENTOR(S) : Rodriguez et al.

It is certified that error appears in the above-identified patent and that said Letters Patent is hereby corrected as shown below:

Column 1, line 10, "timeconsum-" should read -- time-consum- --.

Signed and Sealed this

Twenty-seventh Day of February, 2001

Attest:

NICHOLAS P. GODICI

Attesting Officer     Acting Director of the United States Patent and Trademark Office